(12) United States Patent
Beckers et al.

(10) Patent No.: US 7,037,096 B1
(45) Date of Patent: May 2, 2006

(54) CELLULOSE EXTRUSION

(75) Inventors: Stefan D. Beckers, Hechtel-Eskel (BE);
Peter Weigel, Kleinmachnow (DE);
Hans-Peter Fink, Teltow (DE);
Michael Dosz, Berlin (DE);
Hans-Joachim Purz, Teltow (DE)

(73) Assignee: Fraunhofer-Gesellschaft zur Forderung der Angewandteh Forschung E.V., (DE)

( * ) Notice: Subject to any disclaimer, the term of this patent is extended or adjusted under 35 U.S.C. 154(b) by 0 days.

(21) Appl. No.: 09/830,044

(22) PCT Filed: Oct. 18, 1999

(86) PCT No.: PCT/GB99/03439

§ 371 (c)(1),
(2), (4) Date: Jun. 21, 2001

(87) PCT Pub. No.: WO00/23249

PCT Pub. Date: Apr. 27, 2000

(30) Foreign Application Priority Data

| Oct. 21, 1998 | (EP) | 9823080 |
| Oct. 21, 1998 | (EP) | 9823081 |
| Oct. 21, 1998 | (EP) | 9823083 |
| Oct. 21, 1998 | (EP) | 9823085 |

(51) Int. Cl.
*B29C 47/20* (2006.01)

(52) U.S. Cl. ........................ 425/70; 425/71; 425/326.1; 425/392

(58) Field of Classification Search .................. 425/71, 425/326.1, 392, 70, 67; 264/564, 562, 563
See application file for complete search history.

(56) References Cited

U.S. PATENT DOCUMENTS

| 1,654,253 | A | * | 12/1927 | Blades ........................ 264/558 |
| 3,725,519 | A | * | 4/1973 | Seifried et al. ............. 264/458 |
| 3,767,756 | A | * | 10/1973 | Henderson ................... 264/184 |
| 3,778,205 | A | * | 12/1973 | Turner et al. ................ 425/71 |
| 4,750,873 | A | * | 6/1988 | Loe et al. ..................... 425/71 |
| 4,939,235 | A | * | 7/1990 | Harvey et al. .............. 528/337 |

FOREIGN PATENT DOCUMENTS

EP     0 483 562 A1 * 10/1991

* cited by examiner

*Primary Examiner*—Joseph S. Del Sole
(74) *Attorney, Agent, or Firm*—Michael L. Dunn

(57) ABSTRACT

Apparatus for the production of extruded blown cellulose film from a solution of cellulose, water and an amine-oxide, which includes:—extrusion apparatus for continuously extruding a cellulose solution to produce a cellulose film;—solidifying apparatus for solidifying the extruded cellulose film;—drawing apparatus positioned downstream of the extrusion apparatus for continuously drawing the extruded cellulose film from the extrusion apparatus; and a tubular member for containing precipitation apparatus and for receiving an extruded blown film wherein the tubular member is situated within a precipitation bath. The invention also includes a method of extruding blown film.

2 Claims, 13 Drawing Sheets

Figure 6: Cross sectional morphology of never dried sample 7

Figure 7: Internal surface of sample 7

Figure 8: Cross sectional morphology of never dried sample 8

Figure 9: Internal surface of sample 8

Figure 10: Cross sectional morphology of never dried sample 14

Figure 11: Internal surface of sample 14

Figure 12: Cross sectional morphology of Lommel Standard code 02321o, rewetted

Figure 13: Internal surface of Lommel Standard code 02321o

CELLULOSE EXTRUSION

BACKGROUND OF THE INVENTION

This invention relates to a process and apparatus used in cellulose extrusion and the obtained product, i.e. extruded cellulose film in, for example, sheet or tubular form.

The process relates to extruding a solution of cellulose, water and an amine oxide according to the well-known amine oxide extrusion process. In particular, the process relates to the reduction or avoidance of degradation or discoloration of the extruded cellulose solution, which otherwise leads to poor product quality.

The apparatus also relates to the avoidance of variations in thickness and edge wrinkling of the extruded film.

The apparatus is also suitable for use in extrusion of a blown film into a precipitation medium.

The invention also relates to an extruded cellulose product having a novel structure.

The production of extruded cellulose articles, such as fibers sheets or tubes has been known for more than a century. In this so-called "viscose" process, cellulose is derivatised with carbon disulphide and solubilized in diluted sodium hydroxide to form a solution and the solution is extruded. The extruded cellulose is then regenerated and reverts to its solid form. The viscose process has been used for the manufacture of sausage casings, flat cellulophane films, rayon fibers bottle caps etc. A disadvantage of the viscose process is that it employs carbon disulphide as an intermediate, which is environmentally undesirable.

More recently, the so-called "amine oxide" process has been developed wherein cellulose is dissolved in a mixture of water and an amine-oxide solvent. A commonly used amine-oxide solvent is the tertiary amine-oxide NMMO (N-methyl morpholine N-oxide). This solvent is able to dissolve cellulose without having to first derivatise the cellulose, as for example in the viscose process. Once solubilised the cellulose will precipitate from the solution as a regenerated cellulose product by contacting the solution with a precipitation liquid which is a non-solvent for cellulose and a solvent for NMMO. The most frequently used precipitation liquid for the amine-oxide process is water. Prior to extrusion, the cellulose amine-oxide solution may be heated to a temperature of around 100° C. Thermal stabilisers, such as propylgalate, may be added to the solution to inhibit the thermal degradation of NMMO.

It has now been surprisingly found that using the amine-oxide process, extruded cellulose films having novel structure and enhanced mechanical properties may be obtained.

Furthermore, it has been found when extruding cellulose films, that the extruded material was coloured brown-red. Moreover, the colour intensity varied between different extrusion runs in an apparently uncontrolled manner. Colour variation could even be observed during a single long extrusion run.

In the extrusion step of the amine-oxide process when used to produce tubular casings (for use, for example in the food industry), the tube is extruded into a bath of precipitation liquid. The precipitation liquid is also maintained within the extruded tube so as to solidify the cellulose from the inside. A slight positive pressure of air may be maintained above the precipitation liquid within the extruded tube so as to expand the tube in the transverse direction (ie. transverse to the machine extrusion direction). The presence of precipitation liquid within the extruded cellulose tube causes process difficulties after the tube emerges from the precipitation bath, since it is necessary to cut the tube at regular intervals in order to allow the liquid to drain away. Failure to do so, leads to undesirable stretching of the tube and variations in diameter and thickness.

BRIEF DESCRIPTION OF THE INVENTION

In accordance with the invention an apparatus is provided for the production of extruded blown cellulose film from a solution of cellulose, water and an amine-oxide, which includes
- extrusion apparatus for continuously extruding a cellulose solution to produce a cellulose film;
- solidifying apparatus for solidifying the extruded cellulose film;
- drawing apparatus positioned downstream of the extrusion apparatus for continuously drawing the extruded cellulose film from the extrusion apparatus; and a tubular member for containing precipitation apparatus and for receiving an extruded blown film wherein the tubular member is situated within a precipitation bath.

The invention also includes a method of extruding blown film.

DETAILED DESCRIPTION OF THE INVENTION

It is an object of the present invention to mitigate the above problems.

According to a first aspect of the present invention there is provided a process for extruding a solution of cellulose, water and an amine-oxide, which comprises
- providing a closed vessel containing said cellulose solution;
- providing an inert gas blanket above the cellulose solution in the vessel; and
- delivering the cellulose solution to an extrusion means for extrusion thereof.

Thus, it has been surprisingly found that protecting the stored cellulose solution from oxidation by the provision of an inert gas blanket substantially mitigates against undesirable color variations in the extruded product. Generally, the inert gas is nitrogen, but other inert gases capable of protecting against oxidation might also be used.

The cellulose solution for extrusion comprises water and an amine-oxide. Suitable amine-oxides are known in the art and are particularly tertiary amine-oxides, such as NMMO (N-methyl morpholine N-oxide). Generally, cellulose pulp is mixed with an aqueous amine-oxide solution containing about 50% NMMO. The cellulose is unable to dissolve at such high water content. The water is then removed from the mixture by applying heat and reduced pressure. Typically, the pressure is set so the water boils off at approximately 70° and the vapors are removed and recovered by re-condensation. Once the water content has been reduced from about 50% to about 12%, the NMMO mono hydrate is formed and the cellulose dissolves therein. The temperature is then typically increased to around 95° C. to completely dissolve all the cellulose fibres. The reduced pressure is maintained or increased in order to remove any remaining air bubbles from the cellulose solution. This solution is then suitable for extrusion.

The solution may be extruded directly or stored for prolonged periods without detrimental effects. Furthermore, the solution may be solidified by decreasing the temperature (from around 100° C.) to allow the solution to solidify and then ground to form pellets.

The cellulose solution ready for extrusion is stored in the closed vessel, which enables a blanket of inert gas to be maintained in the free space above the cellulose solution. The inert gas may be slightly pressurized in order to reduce ingress of air from outside the vessel, which might lead to deterioration of the stored cellulose solution. The use of positive pressure of inert gas may also be of assistance in delivering the cellulose solution to the extrusion means.

The cellulose solution is extruded via the extrusion means into any desired shape, such as flat sheets or tubes. The process is particularly applicable to the production of wrappings or tubular casings for sausages, salami or other cased food products. The cellulose casing may be either used during the production of food product and removed thereafter or may be retained in place.

According to a second aspect of the present invention there is provided an apparatus for the production of extruded cellulose film, which comprises:—extrusion means for continuously extruding a cellulose solution to form cellulose film;—precipitation means for solidifying the extruded cellulose film; and—draw means positioned downstream of the extrusion means for continuously drawing the extruded cellulose film from the extrusion means.

Thus, it has surprisingly been found that providing a positive transport mechanism in the form of draw means to continuously draw the extruded film away from the extrusion means gives good control over the thickness of the extruded film.

The cellulose solution for extrusion may be a viscose solution or an amine-oxide solution, according to known technology.

The extrusion means generally comprise an extrusion die shaped to extrude a cellulose film of desired shape and dimensions. In particular, the film may be in the form of a flat sheet or may alternatively be in the form of a tube. Flat cellulose sheets are used in the food industry for wrapping food products. Cellulose tubes are used to encase food products, such as sausages, salami or other cased food products. As mentioned above, particular problems arise with the production of tubular cellulose products, since it is necessary to maintain a volume of precipitation liquid within the tube to assist solidification thereof.

According to a preferred feature of the second aspect of the present invention, when the extruded cellulose film is tubular the draw means in the form of a pair nip rollers which draw the flattened tube away from the extrusion means. Preferably, the nip rolls act to hold the sides of the tube together to form a seal to retain the precipitation liquid in a fixed volume defined between the extrusion means and the draw means. This avoids carry over of liquid downstream and thus minimizes the need to cut the extruded cellulose tube at regular intervals to release carried over liquid. This represents a saving in materials and also in labour costs.

In order to facilitate flattening of the tube prior to the draw means (eg. the nip rollers) it is preferred to provide collapsing means for collapsing the tube from its tubular form towards a flattened form. The collapsing means may be in the form of opposed non-parallel guide plates having a decreasing spacing towards the draw means, typically at an angle of 10 to 35°, preferably 15 to 25°.

In a particular embodiment, the draw means and the collapsing means are combined into a single unit in the form of a pair of opposed non-parallel moving belts which are spaced at an end where the extruded tube enters and come closer progressively towards a nip at the draw means. The moving belts have the benefit of positively transporting the extruded tube through the collapsing means and into the draw means.

Where the collapsing means are stationary, they will generally be coated with a low friction material, such as PVDF. Where the collapsing means are in the form of a moving belt, a belt such as a rubber belt having a suitable surface roughness for transporting the cellulose tube will be chosen.

It is found that the presence of the collapsing means helps to avoid wrinkling of the edges of the flattened tube.

The precipitation means generally comprises a liquid. The liquid may be present in a bath or may be showered onto the extruded film. In the case of the amine-oxide process, the precipitation liquid is generally water or dilute aqueous amine-oxide solution.

The draw means is generally in the form of a pair of nip rollers having a surface formed of a material having appropriate frictional qualities for gently ripping the extruded film without damaging it. The draw means may be driven at a speed which is slightly faster (for example 10 to 250% faster) than the speed of the extrusion means in order to expand the extruded cellulose film in the longitudinal machine direction.

The present invention also relates to a corresponding process for the production of extruded cellulose film.

The present invention when applied to the production of extruded cellulose tube allows the maintenance of a fixed internal volume of precipitation liquid downstream of the extrusion means and the prevention of liquid carry over. It also enables the production of uniform flat tube of a constant wall thickness.

According to a third aspect of the present invention there is provided apparatus for use in extrusion of a blown film into a precipitation medium, the apparatus comprising a tubular member for containing precipitation medium and for receiving an extruded blown tube.

According to a fourth aspect of the present invention there is provided a method of extruding blown film, the method comprising:

extruding material through a die to form a tube;
maintaining the tube interior at a positive pressure; and
passing the tube through a precipitation medium contained within a tubular member.

The aspects of the invention are useful in extrusion operations where a material, such as a cellulose\N-Methyl Morpholine N-Oxide (NMMO) melt solution, is extruded into a precipitation medium, which in the case of a cellulose/NMMO solution is water or aqueous NMMO solution, where the melt solution precipitates, typically to a solid semi-gel state.

The tubular member may serve a number of useful functions: the member may be utilised to guide the extruded tube through the precipitation medium; and the member protects the extruded tube from disturbances in the precipitation medium. As a result, it has been found that the presence of such a tubular member improves the uniformity of the tube wall thickness.

Preferably, the extruded material is a mixture of cellulose in tertiary amine-oxide, such as N-Methyl Morpholine N-Oxide (NMMO) as discussed above.

Preferably also, the inner diameter of the tubular member is between 1.05 and 1.5 times the outer diameter of the extruded tube.

The precipitation medium will typically be provided as a bath of liquid, with the precipitation liquid present both inside and surrounding the tube, and it is preferred that the tubular member is at least partially immersed in the liquid.

Preferably also, an air gap is provided between the extrusion die and the bath of precipitation liquid, and by providing a positive pressure in the air gap within the extruded tube a blowing up or inflation of the tube results. Conveniently, this is achieved by introducing pressurised air into the air gap within the tube.

Preferably also, the extruded tube moves downwardly through the tubular member. Most preferably, the tubular member is vertically oriented.

Preferably also, the tubular member is transparent, permitting the extruded tube to be viewed as it passes through the member.

The tubular member may have a solid wall, or may have a perforated or discontinuous wall.

Preferably also, the precipitation medium flows, preferably axially, between the extruded tube and the tubular member.

Preferably also, following precipitation, the extruded tube is flattened by pick-up members, typically pick-up rollers, and the tubular member is profiled to guide the extruded tube to the pick-up members.

According to a fifth aspect of the present invention there is provided an extruded cellulose product, such as a film or fibre, having a substantially uniform distribution of fine pores throughout its cross-sections.

The fine porous structure obtained is quite distinct from the structure found in cellulose films produced according to the viscose process. In the viscose process, a cross-section through the extruded film shows a relatively few large pores and these pores tend to be elongate with an aspect ratio in excess of 5 to 1. Generally, the pores are elliptical in cross-section. In contrast, the pore structure of the cellulose films of the present invention is quite different and shows a widespread distribution of fine pores substantially evenly distributed throughout the cross-section of the film. The pores tend co be somewhat irregular in shape but the aspect ratio tends to be less than 5 to 1 (e.g. in the range 1:1–1:5). This is believed to give rise to improved mechanical properties.

As determined by electron microscopy, the pore size of the extruded film varies dependent on whether the film has never been dried, is dried, or has been dried and rewetted. Surprisingly, the pore size tends to vary more markedly depending on these parameters than does the pore size of cellulose films produced from the conventional viscose process. In particular, it is found that the pore size of extruded never-dried cellulose film tends to lie in the region 10–500 nm whereas the pore size of the dried film tends to lie in the region 5–50 nm as determined by electron microscopy. In contrast, the spindle-like or elliptical voids of the viscose process tend to have a minor dimension of 5–150 nm and a major dimension of 300–750 nm.

Comparative pore dimensions have also been investigated using small angle X-ray (SAXS) techniques as is described herein. It is noted that the pore volume of dried film tends to lie in the region 0.04–0.05% volume fraction (compared to 0.25 for the viscose process) the pore volume for rewetted film tends to lie in the range 0.05–2% (compared to 0.11 for viscose material). The pore dimension of dried material tends to lie in the range 2.0–2.5 nm (compared to 2.4 for the viscose process) and the pore dimension for rewetted material is in the range 3.2–3.7 (compared to 2.0 for the viscose process). The pore internal surface area of dried film lies in the range 0.7–1.0 $m^2/cm^3$ (compared to 4.3 $m^2/cm^3$ for the viscose process) and for rewetted film tends to be in the region 5–25 $m^2/cm^3$ (compared to about 2 for the viscose process). Thus, the material of the present invention tends to exhibit a multiplicity of fine pores compared to a relatively small number of large pores in the viscose process.

It is found that there is increased permeability through the cellulose film of the present invention which is typically in the range 225–500 mg μm ml/min $cm^2$ g (compared to a value of about 213 for the viscose process). The measurement methodology is given herein.

Finally, it is observed that the material of the present invention is less crystalline and exhibits a crystallinity typically in the range 35–42% (compared to the viscose process of 45%).

It is also observed that variations in the temperature of the precipitation bath (usually water or dilute NMMO solution) can lead to variations in the structure of the extruded cellulose film. In particular, higher temperatures (such as 20° C. tend to favour large pore size, whereas lower temperatures (for example 10° C.) tend to favour smaller pore sizes.

Figure 1:
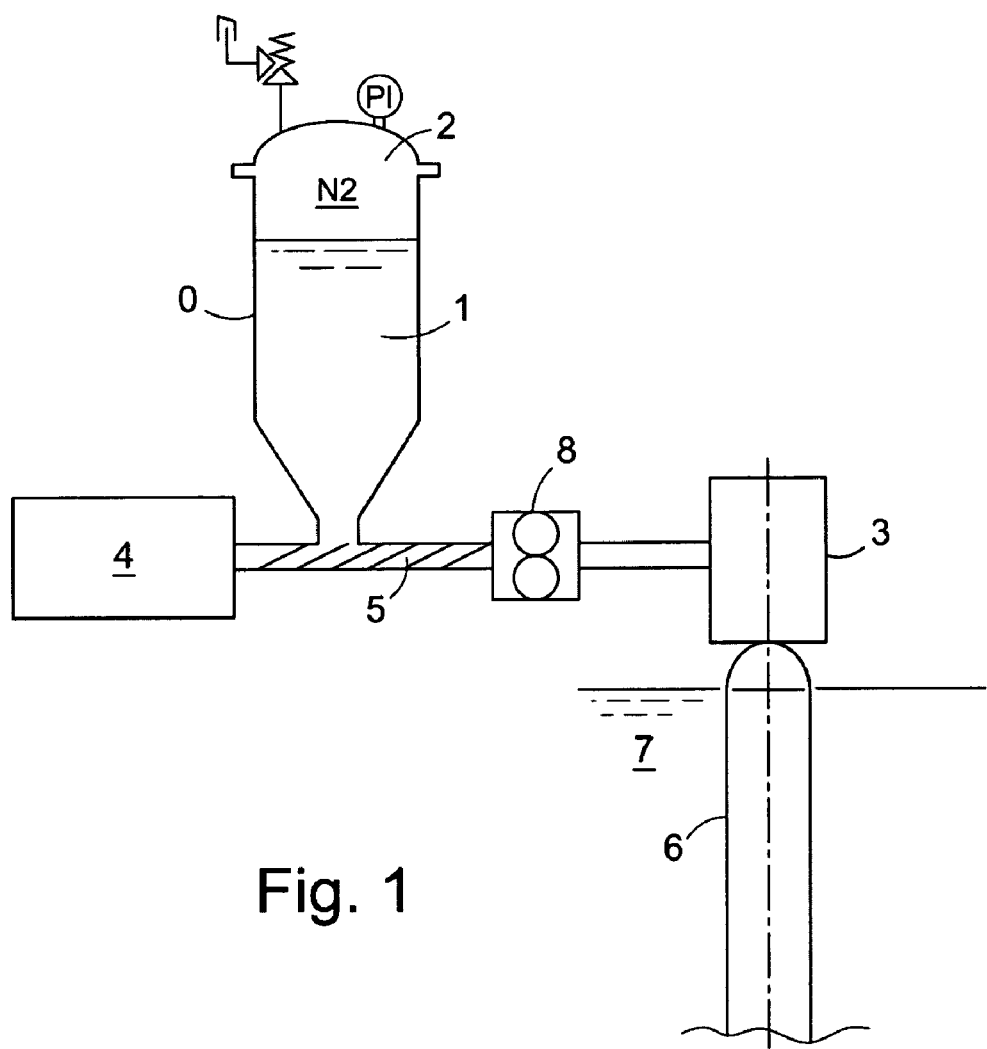
FIG. 1 is a schematic diagram of a first embodiment of the invention showing a nitrogen blanket on top of melted dope in an extruder feeder hopper.

FIG. 1 illustrates schematically apparatus for extruding a cellulose amine-oxide aqueous solution comprising a cellulose storage vessel 0 containing a cellulose amine-oxide solution 1 protected in the free space 2 above by a blanket of nitrogen at a slightly above-atmospheric pressure. The cellulose solution is fed to an extruder screw 5 driven by an extruder drive 4 and is then delivered by a gear pump 8 into an extrusion head 3. The cellulose amine-oxide solution is extruded in the form of a tube 6 via an air gap into a precipitation liquid 7 (for example water). The extruded tube is then finished in conventional manner.

Figure 2:
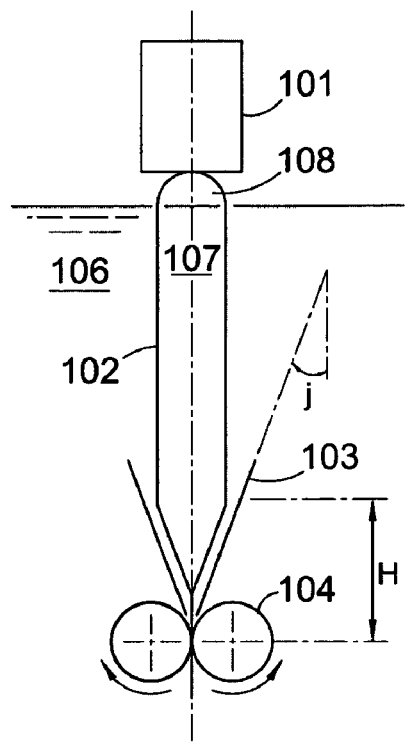
FIG. 2 is a schematic view of a second embodiment of the invention for the production of cellulose tube and employing separate draw means and collapsing means.

FIG. 2 shows schematically an extrusion means 101 including an extrusion die in annular form for extruding a cellulose tubular film 102 into a bath of precipitation liquid 106 via an air gap. In the case of an amine-oxide process, the cellulose solution for extrusion is a solution of cellulose and amine-oxide in water and the precipitation liquid is water or dilute amine-oxide solution. The extruded cellulose tube passes downwardly through the precipitation liquid until it encounters a collapsing device 103 in the form of a pair of opposed non-parallel plates coated with a low friction polymer (eg. PVDF). Each plate is inclined at an angle J of approximately 20° to the longitudinally machine direction (shown in a chain-dotted line). The collapsing means progressively collapses the tube into a flat form. The flattened tube is then drawn into the nip of a pair of rollers 104 which squeeze together the opposite sides of the flattened tube so as to form an effective seal and to supply sufficient pressure to the tube to maintain the extruded tube under a slight tension.

The distance H between the nip of the rollers and the initiation of collapsing of the tube walls can be varied experimentally until optimum results are achieved. Generally, the distance is in the region 10 to 100 centimeters.

An amount 107 of precipitation liquid is also maintained inside the extruded cellulose tube by a means (shown in FIG. 3) which maintains the level of liquid inside the tube approximately the same as that outside the tube and assists solidification of the interior of the extruded tube. An air space 108 is left above the precipitation liquid within the tube which is maintained at slightly above atmospheric pressure (eg. 0.1 to 10 mbar) to assist expansion of the extruded film in the transverse direction.

The effect of the nip rollers 104 is firstly to draw the extruded cellulose tube from the extrusion means thereby maintaining a slight tension in the tube which is found to minimise variations in thickness. Secondly, the nip rollers help define a closed volume of extrusion liquid 107 so that extrusion liquid is not carried further downstream with the cellulose film, which would otherwise necessitate cutting the film to release the liquid.

Figure 3:
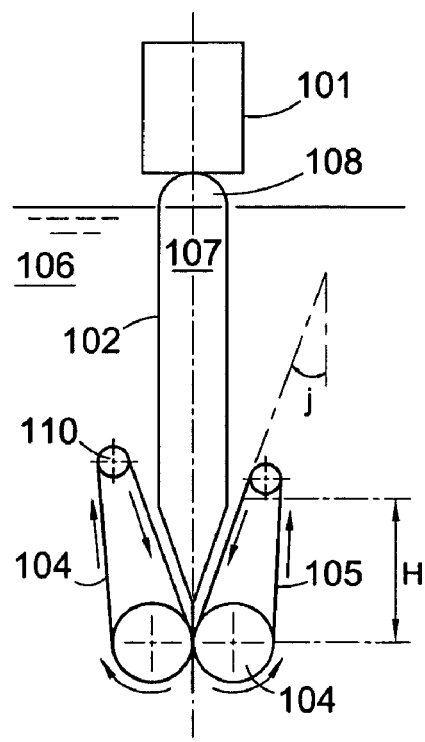
FIG. 3 is a schematic view of a third embodiment employing a combined draw means and collapsing means in the form of a pair of non-parallel moving belts.

FIG. 3 shows a further embodiment in which analogous parts are marked with the same reference numerals as in FIG. 2. It differs from the embodiment shown in FIG. 2 in that the function of the collapsing means and the roller draw means is combined in a pair of opposed non-parallel moving belt conveyors 105. Each conveyor comprises a belt 109 which passes around a nip roll 104 at one end and around an idler roll 110 of smaller diameter at the other end of its travel. The surface of the belts has an appropriate roughness for frictionally engaging and collapsing the tube walls before they are fed into the nip defined between the nip rollers 104. The internal run of each belt is inclined at an angle J of approximately 20° as before. The benefit of the moving belt conveyors is that the extruded cellulose film (which may still be somewhat delicate) is gently engaged by the moving conveyors and progressively fed into the nip of the rollers.

Figure 4:
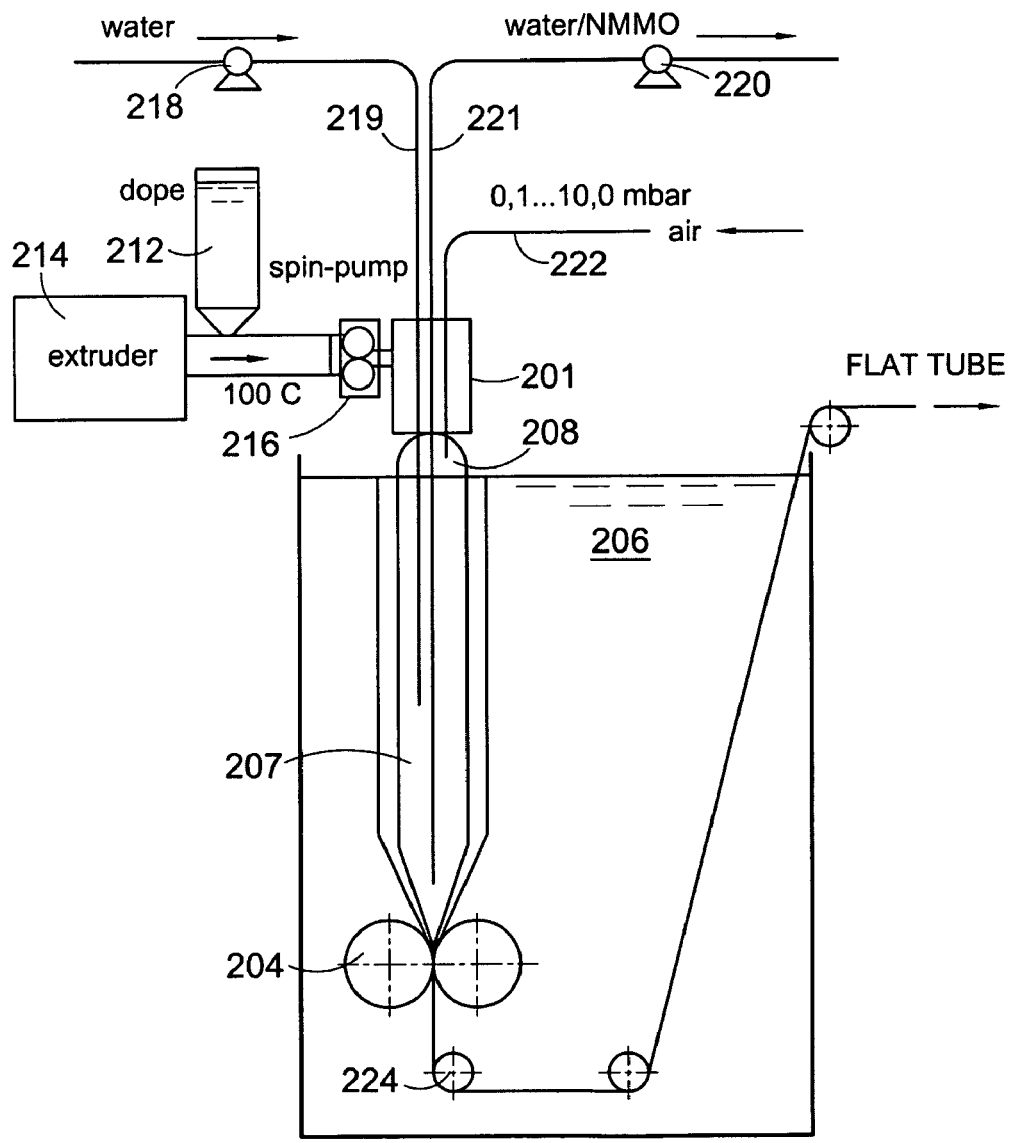
FIG. 4 is a schematic diagram of the overall extrusion process.
Figure 5:
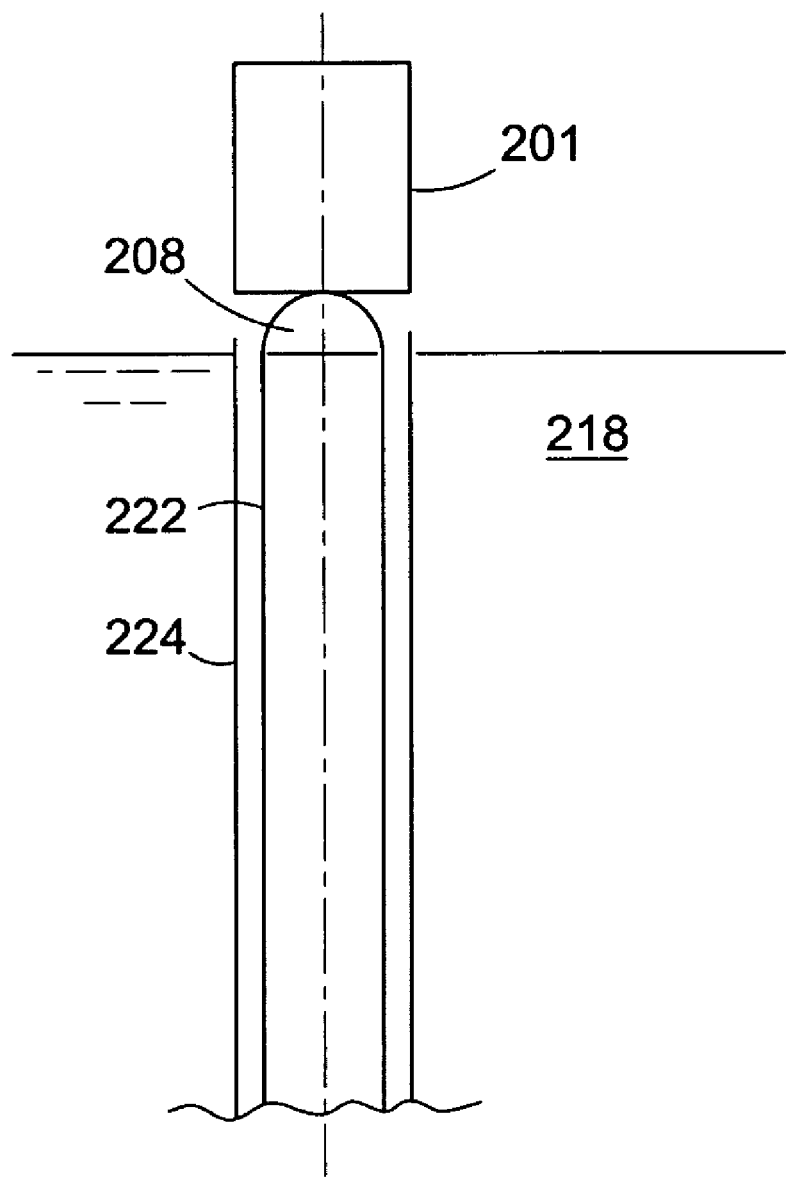
FIG. 5 is an enlarged view of an area of FIG. 4, and showing a tube-guiding pipe.
Figure 6:
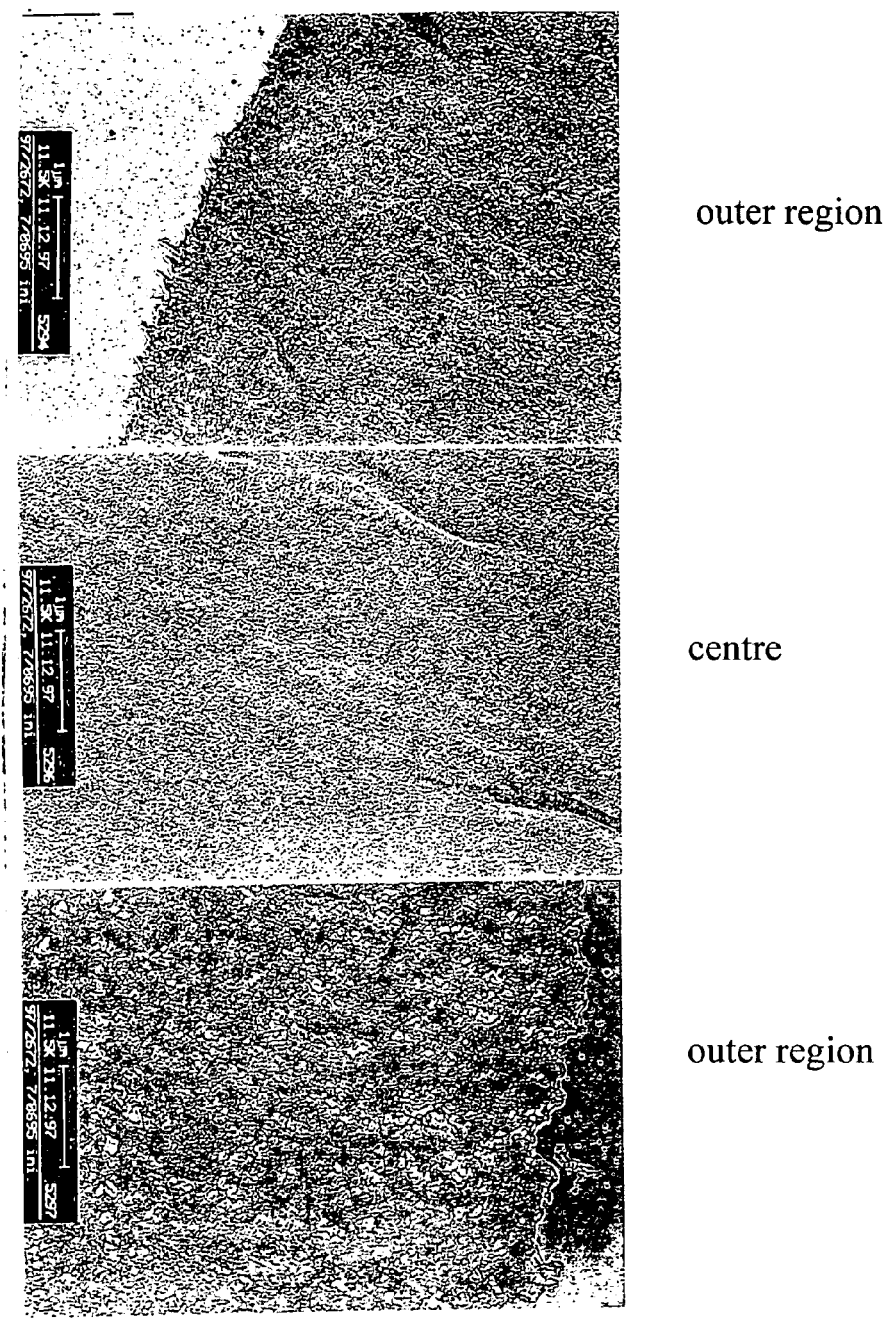
FIG. 6 is a cross sectional morphology of never dried sample 7.

FIG. 4 is an overall schematic diagram of the process and illustrates various processing conditions and FIG. 5 is an enlarged view of FIG. 4 showing guide rolls 224 which act as tube-guiding pipes. Dope (ie. cellulose-amine-oxide aqueous solution) at approximately 100° C. is stored in storage vessel 212. It is transported via extrusion device 214 and an extrusion screw through pump 216 to extruder 201 where the cellulose tube is extruded as described previously. A constant volume of water 207 is maintained in the space between the nip rolls 204 and the extruder by control means (not shown). Input pump 218 and inlet line 219 together with outlet pump 20 and outlet line 211 continuously flush water through the contained volume 207. Clean water is introduced and a dilute solution of water and NMMO (in the case of a typical amine-oxide process) is discharged.

Similarly, a constant volume of air is maintained in the space 208 via a line 222 at a slightly supra-atmospheric pressure in the range 0.1 to 10.0 mbar (for example 1 mbar) to expand the tube transversely.

The extruded tube is collapsed and drawn down through nip rolls 204 as described previously and passes around a succession of guide rolls 224 within the water bath 206 to complete the cellulose solidification process. The flattened tube is then passed through a succession of water washing tanks (not shown) to remove any residual traces of amine-oxide; before plasticiser is applied to the outside of the tube and the tube is reeled for storage.

In this way, water is prevented by the nip rolls from being carried downstream, thus avoiding the need to cut the tube at regular intervals to release trapped water, as in prior art processes. The process allows flat cellulose tube of tightly-controlled dimensions to be produced.

EXAMPLE 1

Showing the Use of an Inert Gas Blanket

A cellulose solution for extrusion was prepared by mixing cellulose pulp with an aqueous NMMO solution containing about 50% by weight NMMO. Water was removed from the mixture by applying heat and a reduced pressure. The water boiled off at approximately 70° C. and the vapours were recovered in a condensor. Once the water content had been reduced to about 12%, the NMMO monohydrate formed and the cellulose began to dissolve in the NMMO monohydrate solution. A stabiliser was added to the solution to inhibit thermal degradation of NMMO. The temperature was then increased to about 95° C. and all the cellulose fibres dissolved to form an extrusion solution. The pressure was further reduced to remove air bubbles from the cellulose solution. At a temperature of about 100° C. the cellulose solution is a visco-elastic melt with a high viscosity and a pronounced elastic behaviour. The time to produce the cellulose solution was about 3 hours.

The cellulose solution was then stored in a storage vessel such as shown in FIG. 4 and extruded through an annular die so as to form a NMMO-cellulose tube. The tube was passed into a precipitation bath containing a precipitation medium, such as water or aqueous NMMO solution. A positive pressure is applied into the air gap between the extrusion die and the precipitation bath so as to keep the tube inflated up. The inner volume of the tube is also kept filled up with precipitation liquid, the composition of which is controlled to be constant.

In the absence of a nitrogen blanket above the cellulose solution in the storage vessel, it was frequently noticed that the extruded tube was coloured brown-red and that the colour intensity varied between different extrusion runs. Moreover, even during a single extrusion run of 20 minutes the colour changed from light-red at the beginning of the run to dark brown-red at the end. However, when a nitrogen blanket was employed in the storage vessel according to the present invention, the amount of discolouration was reduced. Moreover, the pressurised nitrogen enhanced filling of the extruder screw.

EXAMPLE 2

Showing Details of the Extruded Cellulose Product

A cellulose solution for extrusion was prepared by mixing cellulose pulp with an aqueous NMMO solution containing about 50% by weight NMMO. Water was removed from the mixture by applying heat and a reduced pressure. The water boiled off at approximately 70° C. and the vapours were recovered in a condensor. Once the water content had been reduced to about 12%, the NMMO monohydrate formed and the cellulose began to dissolve in the NMMO monohydrate solution. A stabiliser was added to the solution to inhibit thermal degradation of NMMO. The temperature was then increased to about 95° C. and all the cellulose fibres dissolved to form an extrusion solution. The pressure was further reduced to remove air bubbles from the cellulose solution. At a temperature about 100° C., the cellulose solution is a visco-elastic melt with a high viscosity and a pronounced elastic behaviour. Time to produce the cellulose solution was about 3 hours.

The cellulose solution was then stored in a storage vessel and extruded through an annular die so as to form a NMMO-cellulose tube. The tube was passed into a precipitation bath containing a precipitation medium, such as water or aqueous NMMO solution. A positive pressure was applied into the air gap between the extrusion die and the precipitation bath so as to keep the tube inflated. The inner volume of the tube was also kept filled up with precipitation liquid, the composition of which was controlled to be constant.

Figure 9:
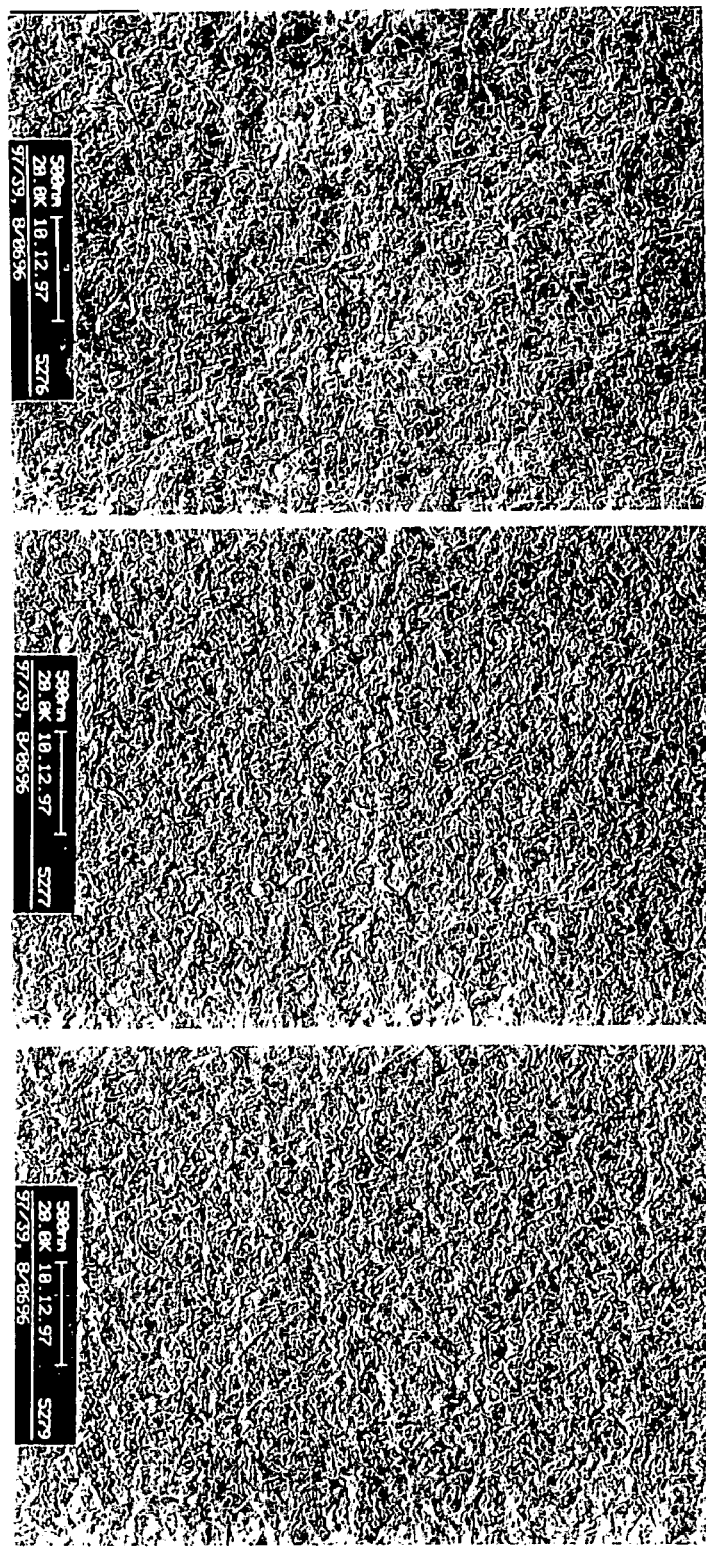
FIG. 9 is the internal surface of sample 8.
Figure 10:
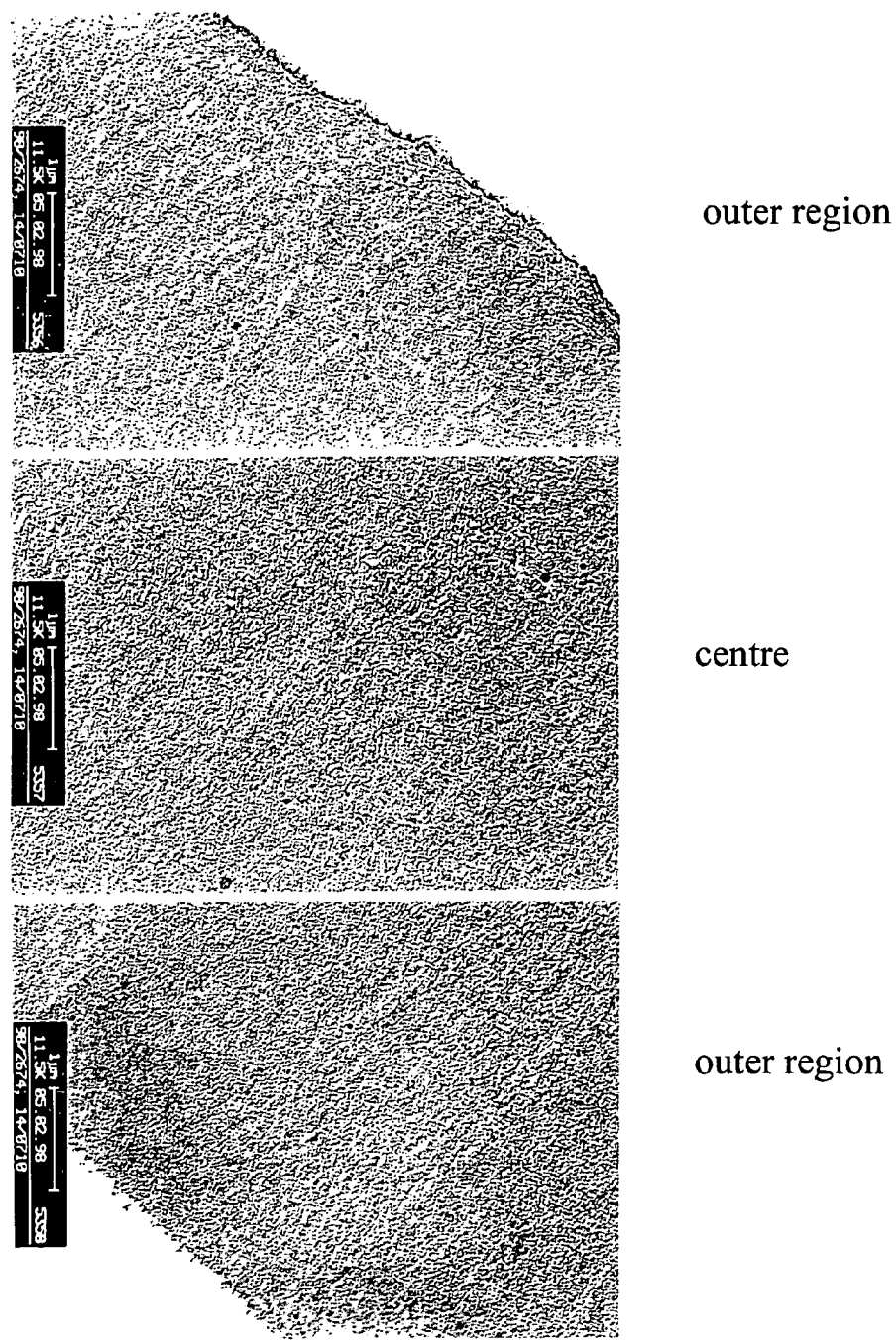
FIG. 10 is a cross sectional morphology of never dried sample 14.

Measurements were carried out on the extruded film and photomicrographs thereof are shown in FIGS. 6 to 13. FIG. 9 is an X-ray pole figure.

1. Transmission Electromicroscopy (TEM)

Transmission electromicroscopy was carried out according to well known procedures. The cross-sectional morphology of the NMMO casings is characterised by a network structure in which pores of varying size are embedded (see FIG. 1). In general, the cross-sectional morphology can be divided into three zones, which do not have sharp boundaries and which tend to differ with respect to pore size and pore distribution, referred to as outer region, middle region and outer region. As a function of the processing conditions both symmetrical and asymmetrical morphologies can occur, as well as variations in dimensions of the regions and core sizes (Table 1). It is also noted that precipitation bath temperatures have an effect on pore dimensions, lower temperatures (e.g. 10° C.) giving generally smaller pores than higher temperatures (e.g. 20° C.). This becomes evident by comparing FIGS. 6, 8 and 10 according to the present invention with Table 1 (viscose process for comparison). Reference to Table 1 also shows a comparison of cross-sectional morphologies of never-dried samples on the one hand and dried and rewetted samples on the other, which shows that the drying process causes irreversible changes in the pore size such that rewetting is not capable of re-establishing the original pore size of never dried samples.

Figure 7:
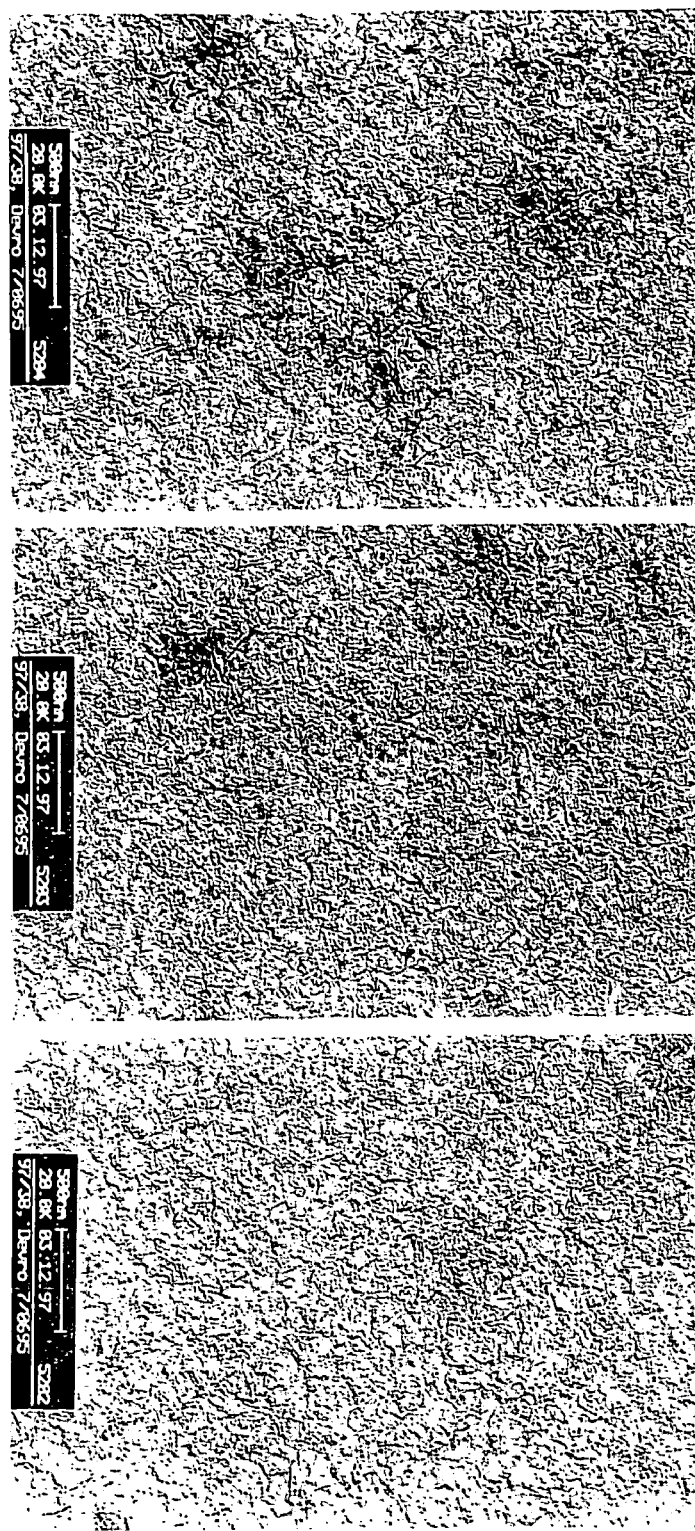
FIG. 7 is the internal surface of sample 7.
Figure 8:
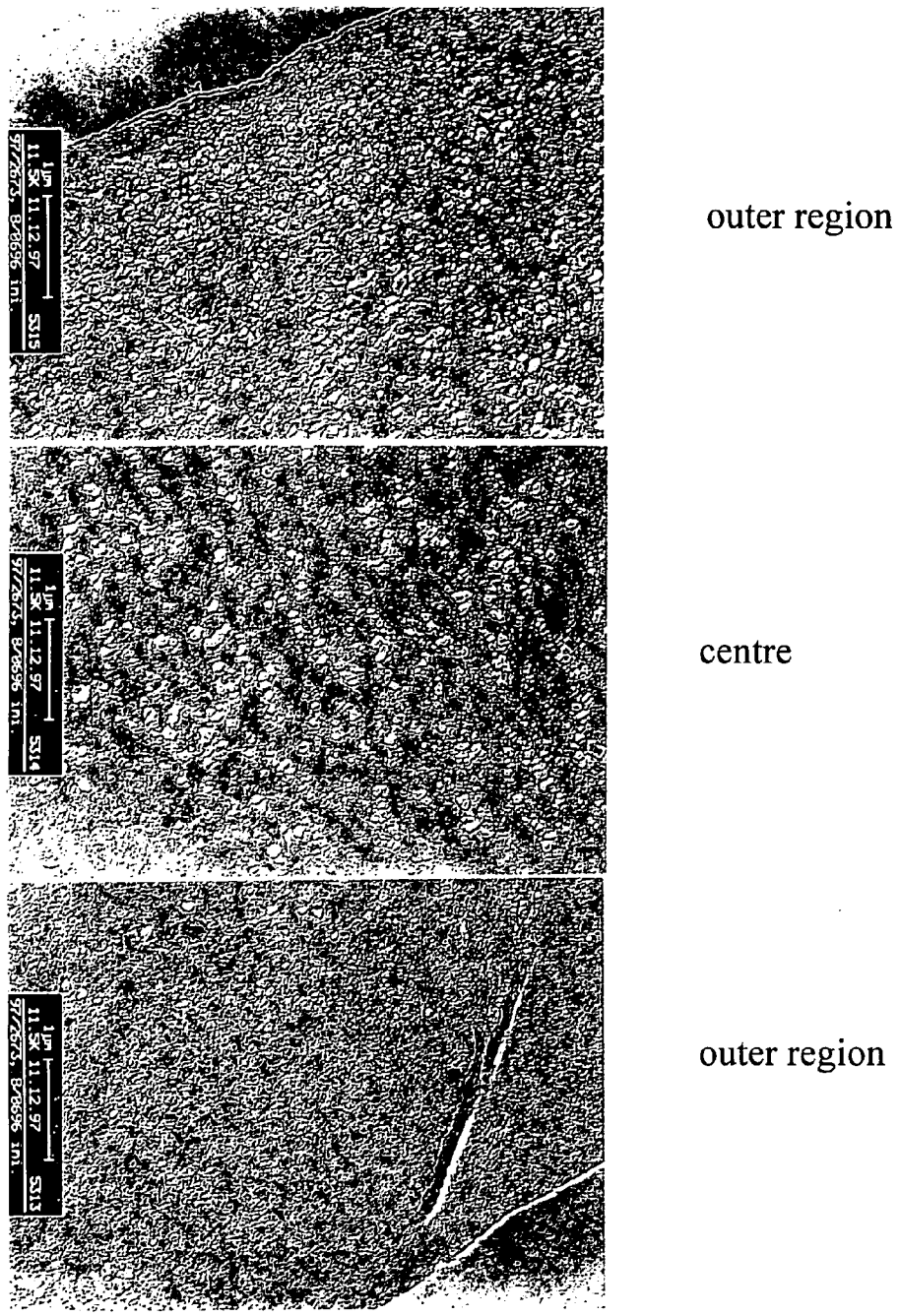
FIG. 8 is a cross sectional morphology of never dried sample 8.
Figure 11:
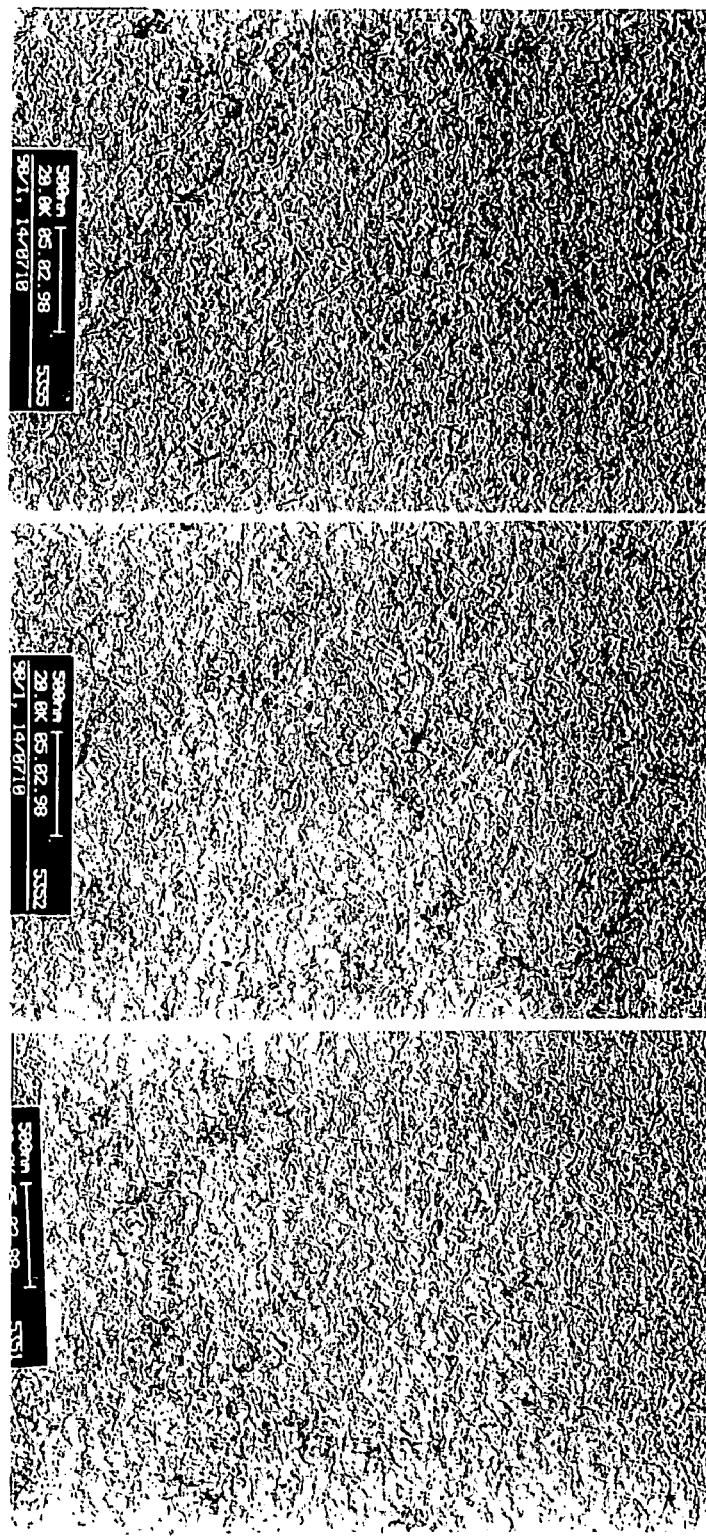
FIG. 11 is the internal surface of sample 14.
Figure 12:
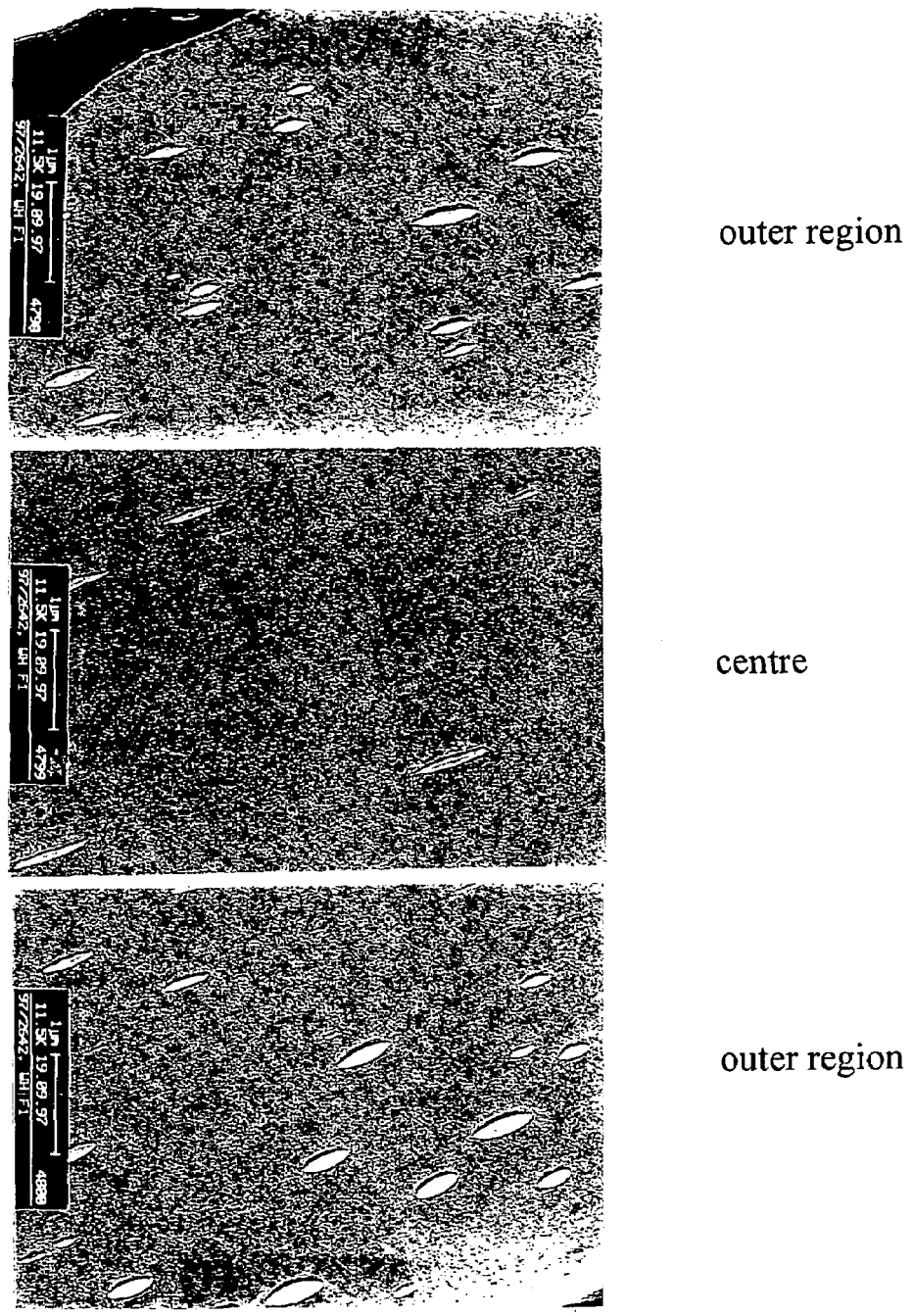
FIG. 12 is a cross sectional morphology of Lommel Standard code 02321o, rewetted.
Figure 13:
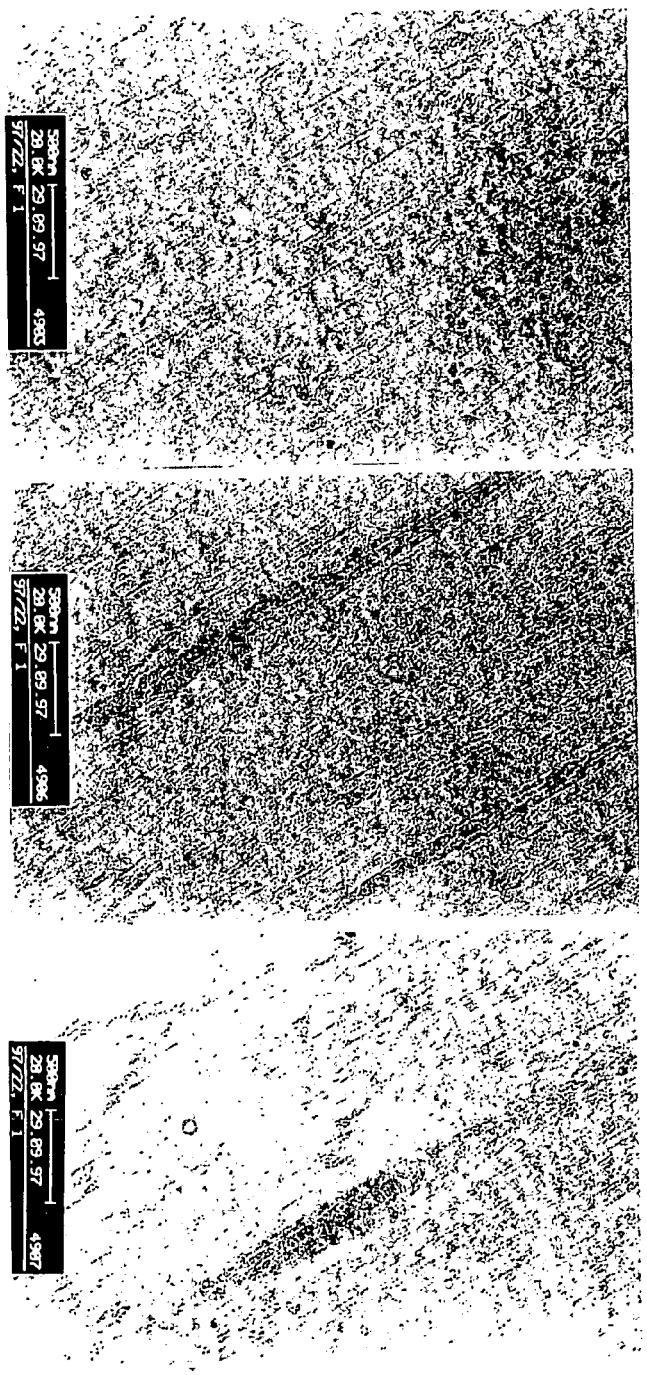
FIG. 13 is the internal surface of Lommel Standard code 02321o.

The inner surface of the samples shows mainly an irregular network of aggregated fibrillar bundles without any preferred orientation (FIGS. 7, 9 and 11). The dimensions of the fibrillar bundles vary somewhat as a function of processing conditions, as does the surface roughness. The morphology of the viscose casings (FIGS. 12 and 13) by comparison is markedly different from those of the NMMO films of the present invention. Typical for the viscose casings is a symmetrical dense precipitation structure with immersed spindle-like voids, which are oriented in the machine direction of extrusion. Also, the surface structure of the viscose casings (FIG. 13) is different from that of the NMMO films of the present invention. Characteristic of the viscose surfaces are micro and macro crazes as well as wrappings, preferentially oriented in the machine extrusion direction. Depending on processing conditions, variations of the pattern may occur.

2. X-Ray Texture Investigation

Figure 14:
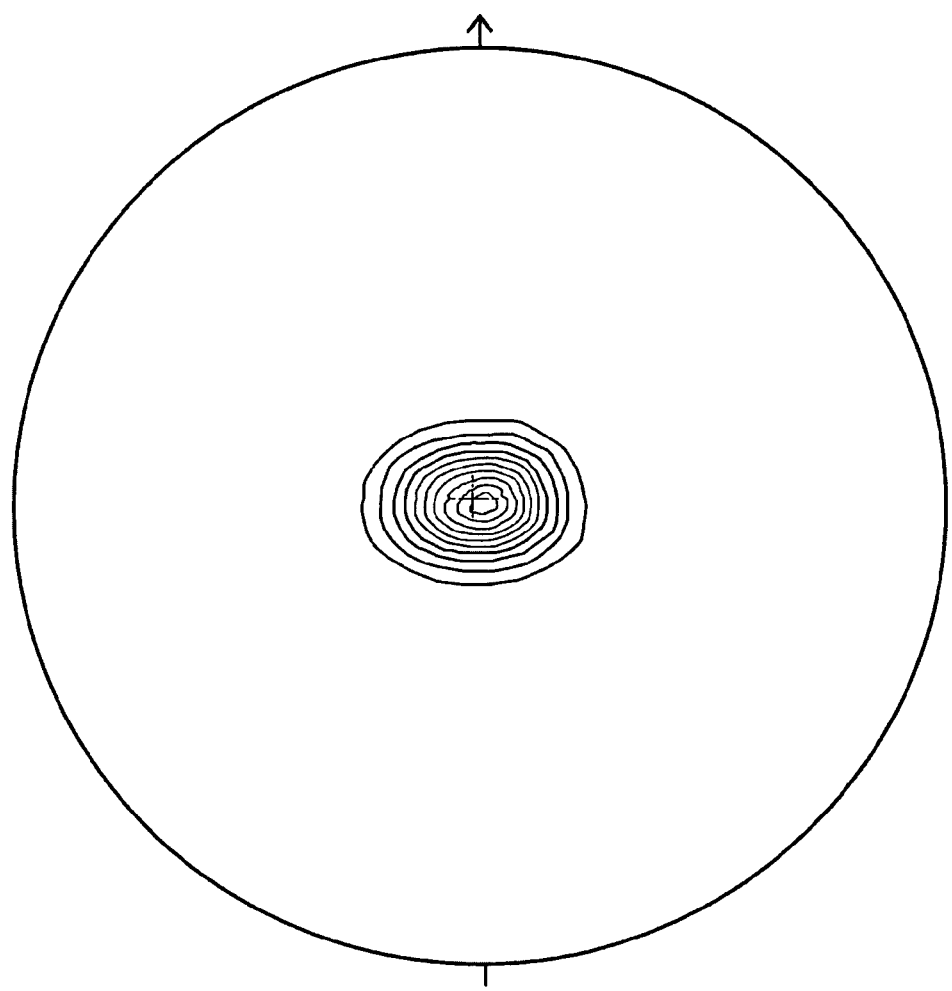
FIG. 14 shows an example of the pole values of sample 14.

In order to determine the orientational state of the samples, pole figures were measured with an X-ray texture goniometer. The (1–10) and (110) pole figures were recorded in reflection and transmission geometries, respectively. FIG. 14 shows an example of the (1–10) pole figure of Sample 14. From the half-width of the distribution curves obtained by cutting the pole figures in the machine (M) and transverse (T) directions the parameters of uniplanar orientation in the M-direction (Ogm) and in the transverse direction (Ogt) and the axial chain orientation parameters (OGa) were determined. The results for the air-dried samples are summarised in Table 2.

It can be seen from Table 2 that, as a function of the processing conditions, the parameter of uniplanar orientation (OGm) varies more strongly than (OGt) in a transverse direction. The strongest variation is found for the axial chain orientation (OGa). For the sake of comparison, the corresponding parameters for a viscose sample are also given.

3 Wide Angle X-Ray Defraction (WAXS)

WAXS investigations were performed in conventional manner with a wide angle X-ray defractometer. From the corrected scattering curves of isotropised samples the degree of crystallinity (Xc) and the lattice distortion parameter (k) were calculated according to the Ruland-Vonk method. After peak separation, averaged lateral crystallite sizes (Dhkl) were determined from the half-width of the peaks with the help of the Scherrer equation. Results for the air-dried samples are summarised in Table 3. The variation in degree of crystallinity as a function of processing conditions is relatively low (36–41°) for the present cellulose film. On the other hand, the crystallinity of the conventional viscose casing is higher (about 45°). The lateral crystalline sizes do not show significant differences. Again, the values for the viscose sample are higher.

4. Small Angle X-Ray Investigations (SAXS)

SAXS investigations were performed using a Kratky camera with a position sensitive linear detector. According to the Porod scattering theory, from the corrected scattering curves in absolute units, the volume fraction (Wv) of the pores in colloidal dimensions, and a measure of the void diameter (Iv) (cord main intersection length) as well as the internal surface (Osp) were calculated.

Table 4 shows the results of the SAXS investigations of dried and rewetted samples. It should be noted that the SAXS method records pores in colloidal dimensions (1 to about 100 nm) only. Pore volume, average pore size and specific internal surface of the dried samples 3 and 4 do not differ significantly. After storage of these samples in water and careful drying by means of a solvent exchange procedure, pore volume and internal surface increase dramatically. This is more the case for sample 4 than for sample 3. For comparison, the effect is not present in viscose casings, and on the contrary pore volume and internal surface tend to decrease following such treatment.

Permeability

For selected samples from the experimental program, permeability measurements were carried out for which the results are shown in Table 5. Permeability is measured using a solution of $K_3Fe(CN)_6$. This shows that permeability for the NMMO casings of the present invention are higher than those for the comparison viscose casings.

TABLE 1

| Experiment | Precipitation bath temp. (°C.) | cross-section | width of outer region (μm) | pore size (nm) outer region | pore size (nm) middle | pore size (nm) outer region | internal surface orientation | internal surface profile | bundle-dim. (nm) |
|---|---|---|---|---|---|---|---|---|---|
| 1. never dried | 20 | asymmetrical | 2.5 ... 4 | 10 ... 100 | 400 ... 500 | 10 ... 175 | | | |
| 1. dried | 20 | asymmetrical | | 5 ... 45 | 5 ... 45 | 5 ... 150 | none | embossed | 15 ... 70 |
| 2. never dried | 10 | symmetrical | 2.5 ... 3.5 | 10 ... 60 | 10 ... 100 | 10 ... 60 | | | |
| 2. dried | 10 | symmetrical | | 5 ... 30 | 5 ... 50 | 5 ... 30 | none | flat | 6.5 ... 30 |
| 3. never dried | 20 | symmetrical | 1.5 ... 2.3 | 10 ... 60 | 10 ... 150 | 10 ... 60 | | | |
| 3. dried | 20 | symmetrical | | | 5 ... 30 | | none | flat | 6.5 ... 30 |
| 4. never dried | 10 | symmetrical | 1.5 ... 2.5 | 10 ... 60 | 10 ... 100 | 10 ... 60 | | | |
| 4. dried | 10 | symmetrical | | 5 ... 30 | 5 ... 25 | 5 ... 30 | none | flat | 6.5 ... 30 |
| 5. never dried | 10 | asymmetric | 2.5 | 10 ... 70 | 10 ... 120 | 10 ... 100 | | | |
| 5. dried | 10 | | | | | | none | flat | 6.5 ... 30 |
| 6. never dried | 20 | asymmetric | 1.5 ... 2.6 | 10 ... 120 | 10 ... 350 | 10 ... 80 | | | |
| 6. dried | 20 | | | | | | none | embossed | 15 ... 70 |
| 7. never dried | 10 | asymmetric | 2.0 ... 4.0 | 10 ... 60 | 10 ... 60 | 10 ... 200 | | | |
| 7. dried | 10 | | | | | | none | flat | 6.5 ... 30 |
| 8. never dried | 20 | asymmetric | 2.5 ... 3.0 | 10 ... 100 | 10 ... 200 | 10 ... 175 | | | |
| 8. dried | 20 | | | | | | none | flat | 15 ... 50 |
| 14. never dried | 10 | asymmetric | 0.5 ... 1.0 | 10 ... 60 | 10 ... 100 | 10 ... 100 | | | |
| 14. dried | 10 | | | | | | none | flat | 15 ... 30 |
| VISCOSE CASING | | symmetrical | | spindle-like voids a = 5 ... 150, b = 300 ... 750 | | | strong in M-direction | w-shaped warpings, grooves | |

TABLE 2

Orientational parameters from X-ray pole figure investigations

| Sample dried | $FWHM_M$ [degree] | Uniplanar $OG_M$ | orientation $FWHM_T$ [degree] | $OG_T$ | Axial chain $FWHM_A$ [degree] | orientat. $OG_A$ |
|---|---|---|---|---|---|---|
| 1 | 45.3 | 0.75 | 42.9 | 0.75 | no orienta. | 0 |
| 2 | 33.9 | 0.81 | 41.2 | 0.77 | 55 | 0.69 |
| 3 | 40.2 | 0.78 | 39.4 | 0.78 | 59 | 0.67 |
| 4 | 36.7 | 0.80 | 42.7 | 0.76 | 86 | 0.52 |
| 5 | 41.5 | 0.77 | 40.3 | 0.78 | no orienta. | 0 |
| 6 | 49.3 | 0.73 | 44.5 | 0.75 | 64 | 0.64 |
| 7 | 44.3 | 0.75 | 43.0 | 0.76 | 85 | 0.53 |
| 8 | 45.3 | 0.75 | 44.5 | 0.75 | 55 | 0.69 |
| 14 | 37.2 | 0.79 | 43.0 | 0.76 | 61 | 0.66 |
| VISCOSECASING | 29.5 | 0.84 | 39.0 | 0.78 | 70 | 0.61 |

FWHM - full width at half maximum;
M, T and A - machine, transverse and atimuthal directions;
OG - orientational parameters

TABLE 3

Degree of crystallinity and crystallite sizes of the air-dried samples as determined from X-ray investigations

| Sample dried | $x_c$ [%] | $k \cdot 10^2$ [$nm^2$] | $D_{(101)}$ [nm] | $D_{(10\text{-}1)}$ [nm] | $D_{(002)}$ [nm] |
|---|---|---|---|---|---|
| V1 | 39 | 2.6 | 3.9 | 4.6 | 3.3 |
| V2 | 41 | 2.3 | 3.9 | 4.3 | 3.1 |
| V3 | 39 | 2.1 | 3.6 | 4.1 | 3.4 |
| V4 | 39 | 2.5 | 3.6 | 4.2 | 3.3 |
| V5 | 38 | 2.4 | 3.9 | 4.3 | 3.2 |
| V6 | 37 | 2.5 | 3.7 | 4.3 | 3.5 |
| V7 | 36 | 2.3 | 3.7 | 4.0 | 3.4 |
| V8 | 41 | 2.2 | 3.6 | 4.3 | 3.4 |
| V14 | 36 | 2.2 | 3.9 | 4.1 | 3.5 |
| VISCOSE CASING | 45 | 2.3 | 4.5 | 4.5 | 3.6 |

$x_c$- degree of crystallinity, k- disorder parameter. $D_{(101)}$- crystallite dimensions

TABLE 4

Table contains the results of the SAXS investigations of the dried and rewetted samples. It should be considered that the SAXS method records pores in colloidal dimensions (1 to about 100 nm) only.

| Sample | $w_v$ [%] | $l_v$ [nm] | $o_{sd}$ [$m^2/cm^3$] |
|---|---|---|---|
| 3, dried | 0.04 | 2.4 | 0.8 |
| 3, rewetted | 0.58 | 3.3 | 7.0 |
| 4, dried | 0.05 | 2.1 | 0.9 |
| 4, rewetted | 1.97 | 3.6 | 22.2 |
| VISCOSE CASING DRIED | 0.25 | 2.4 | 4.3 |
| VISCOSE CASING REWETTED | 0.11 | 2.0 | 2.0 |

$w_v$- volume fraction of pores, $l_v$- averaged pore dimensions. $o_{sd}$- specific internal surface

TABLE 5

Permeability values of cellulose fibers (substance $K_2Fe(CN)_6$)

| Experiment | permeation value [mg μm ml/(min cm² g)] |
|---|---|
| 7 | 394 |
| 8 | 331 |
| 9 | 362 |
| 14 | 379 |
| 17 | 276 |
| VISCOSE CASING | 213 |

What is claimed is:

1. Apparatus for the production of extruded blown tubular cellulose film from a solution of cellulose, water and an amine-oxide, which comprises
    extrusion means for continuously extruding a cellulose solution to produce a blown tubular cellulose film;
    liquid precipitation means for solidifying the extruded cellulose film;
    draw means positioned downstream of the extrusion means for continuously drawing the extruded cellulose film from the extrusion means;
    a precipitation bath container having a closed bottom containing the precipitation means; and
    a tubular member within the precipitation bath container surrounded by and containing precipitation means, said tubular member being arranged in the precipitation bath from a top surface of the precipitation means to the draw means and being arranged for receiving the extruded blown tubular film wherein the tubular member is situated within a precipitation bath.

2. Apparatus for the production of extruded blown cellulose film from a solution of cellulose, water and amine-oxide, which comprises:
    a) an extruder for continuously extruding a cellulose solution;
    b) means for blowing the extruded solution into an extruded blown cellulose film;
    c) a precipitation bath container having a closed bottom containing liquid precipitation means for precipitating the extruded cellulose solution to produce a solidified cellulose film;
    d) means positioned downstream from the extruder for continuously drawing the extruded cellulose film from the extrusion means; and
    e) a tubular member for containing the precipitation means and for receiving the extruded blown film wherein the tubular member is situated within the precipitation bath so that the precipitation means is both inside and outside the tubular member and so that the tubular member extends from a top surface of the precipitation means to the means positioned downstream from the extruder for continuously drawing the extruded cellulose film and the tubular member is sized to act as a guide for the extruded blown film and protects the extruded blown film from disturbances in the precipitation means thereby improving uniformity in the extruded blown cellulose film.

* * * * *